C. W. ARMBRUST.
BRAKE SHOE.
APPLICATION FILED FEB. 19, 1916.
1,231,691. Patented July 3, 1917.
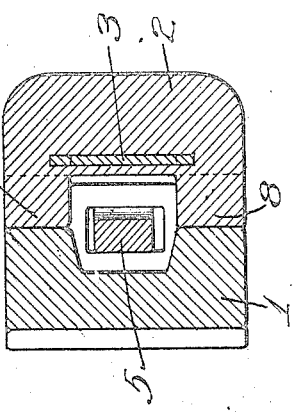
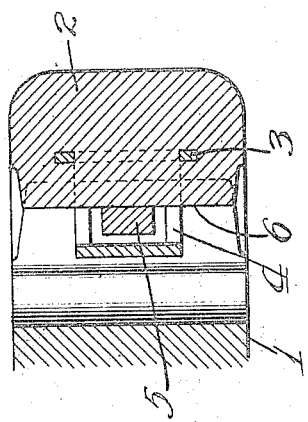
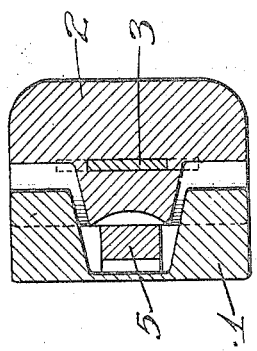
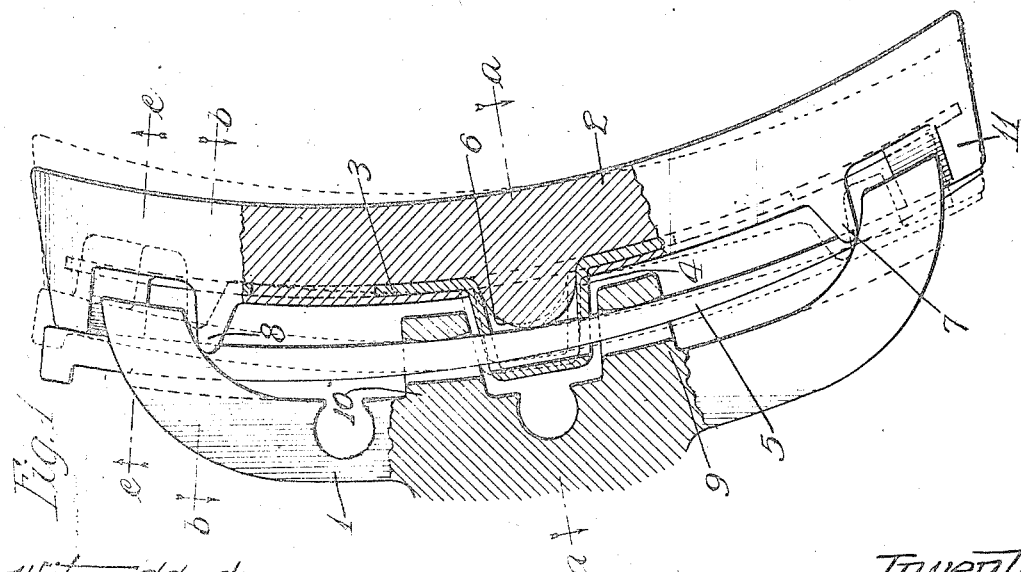
Witnesses:
Inventor:
Charles W. Armbrust
by May W. Zabel  atty.

UNITED STATES PATENT OFFICE.

CHARLES W. ARMBRUST, OF CHICAGO, ILLINOIS, ASSIGNOR, BY MESNE ASSIGNMENTS, TO THE AMERICAN BRAKE SHOE & FOUNDRY COMPANY, OF WILMINGTON, DELAWARE, A CORPORATION OF DELAWARE.

BRAKE-SHOE.

1,231,691.     Specification of Letters Patent.     Patented July 3, 1917.

Application filed February 19, 1916. Serial No. 79,238.

*To all whom it may concern:*

Be it known that I, CHARLES W. ARMBRUST, a citizen of the United States, residing at Chicago, in the county of Cook and State of Illinois, have invented a certain new and useful Improvement in Brake-Shoes, of which the following is a full, clear, concise, and exact description, reference being had to the accompanying drawings, forming a part of this specification.

My invention relates to brake shoes and is primarily concerned with a construction for brake shoes in which a displacement or shifting of the brake shoe relative to the brake head may be obtained, thus to secure an even wear of the brake shoe, thereby insuring a longer life, and of course better braking qualities, and taking unnatural strain off of the brake apparatus.

In one form of carrying out my invention, I so arrange the brake shoe that it is shiftingly held by the brake head to thus permit of a slight tilt or shift to permit the brake shoe to engage the wheel evenly throughout the entire braking surface of the brake shoe.

This particular form of carrying out my invention is the one I have selected for illustration herein, although of course as is apparent, my invention is capable of many and various modifications within its scope, this particular form however being illustrated in the accompanying drawing, in which—

Figure 1 is a side view partly in section of a brake shoe and brake head constructed in accordance with my invention;

Fig. 2 is a section on line *a—a* of Fig. 1;

Fig. 3 is a section on line *b—b* of Fig. 1, and

Fig. 4 is a section on line *c—c* of Fig. 1.

In the drawings I show a brake head 1 adapted to support a brake shoe 2. This brake shoe may have any suitable style of metal back 3. The brake shoe is provided with a key lug 4, part of which is formed from the back 3 and part of which consists of the metal forming the brake shoe, all of which coöperate with the key 5 to hold the brake against rattling.

The metal of the brake shoe is rounded as shown more clearly at 6 where this metal engages the inner side of the key 5. This key 5 of course passes through the brake head as readily apparent, the key being permitted a slight movement as seen more clearly from the illustration in Fig. 1. The brake shoe is also provided with guide lugs 7 and 8 which normally engage the inner surface of the arms of the brake head. The holding lugs 9 and 10 provided upon the brake head between which the key lug 4 is mounted are large enough so there is a certain clearance between the key lug and the coöperating lugs 9 and 10 provided upon the brake head.

It will thus be seen, referring to Fig. 1, that the brake shoe may be permitted a slight shifting movement between the limits of movement permitted between the key lug and the lugs 9 and 10. This movement of course contemplates that in the ordinary operation the guide lugs 7 and 8 will slide along the curved surface of the brake head to permit the shoe to adjust itself against the surface of the wheel.

There is thus provided a construction which permits of a shifting movement of the brake shoe whereby the accommodation desired may be effected. Of course, suitable play is permitted at the brake head seats so as to permit of the shoe sliding along the base of the end lugs 11. The rounded surface 6 coöperates in this connection, if needed.

From what has been described the nature of my invention will be readily clear to those skilled in the art. It will also be apparent that many forms of carrying out my invention will suggest themselves. Having however thus described one form which my invention may take, what I claim as new and desire to secure by Letters Patent is:

1. A device of the character described comprising a brake head, a brake shoe tiltably carried by said brake head, means whereby said brake shoe has a sliding engagement with said brake head to thereby permit said brake shoe to adjust itself concentrically with the wheel, and a sliding key, said sliding key serving as the sole means for holding said shoe and head together.

2. A device of the character described comprising a brake head, a brake shoe shiftably carried by said brake head, means whereby said brake shoe has a sliding engagement with said brake head to thereby permit said brake shoe to adjust itself concentrically with the wheel, and a sliding key, said sliding key serving as the sole means for holding said shoe and head together.

3. A device of the character described comprising a brake head, a brake shoe, means whereby said head and shoe are tiltingly engaged, means whereby said brake shoe has a sliding engagement with said brake head to thereby permit said brake shoe to adjust itself concentrically with the wheel, and a key, said key serving as the sole means for holding said head and shoe together.

4. A device of the character described comprising a brake head, a brake shoe, means whereby said head and shoe are shiftingly and tiltably engaged, and a key, said key serving as the sole means for holding said head and shoe together.

5. A device of the character described comprising a brake head, a brake shoe, means whereby said head and shoe are tiltingly engaged, and a key, said key serving as the sole means for holding said head and shoe together, said brake head having holding lugs and said brake shoe having a key lug capable of movement between said holding lugs.

6. A device of the character described comprising a brake head, a brake shoe, means whereby said head and shoe are shiftingly engaged to thereby permit said brake shoe to adjust itself concentrically with the wheel, and a key, said key serving as the sole means for holding said head and shoe together, said brake head having holding lugs and said brake shoe having a key lug capable of movement between said holding lugs.

7. A device of the character described comprising a brake head, a brake shoe, means whereby said head and shoe are slidably engaged to thereby permit said brake shoe to adjust itself concentrically with the wheel, and a key, said key serving as the sole means for holding said head and shoe together, said means including guide lugs provided upon said brake shoe and engaging said brake head.

8. A device of the character described comprising a brake head, a brake shoe, means whereby said head and shoe are shiftingly engaged to thereby permit said brake shoe to adjust itself concentrically with the wheel, and a key, said key serving as the sole means for holding said head and shoe together, said means including guide lugs provided upon said brake shoe and engaging said brake head.

9. A device of the character described comprising a brake head, a brake shoe, means whereby said head and shoe are tiltingly engaged, and a key, said key serving as the sole means for holding said head and shoe together, said means including guide lugs provided upon said brake shoe and engaging said brake head, said brake head having holding lugs and said brake shoe having a key lug movably interposed between said holding lugs.

10. A device of the character described comprising a brake head, a brake shoe, means whereby said head and shoe are shiftingly engaged, and a key, said key serving as the sole means for holding said head and shoe together, said means including guide lugs provided upon said brake shoe and engaging said brake head, said brake head having holding lugs and said brake shoe having a key lug movably interposed between said holding lugs.

11. A device of the character described comprising a brake head, a brake shoe tiltably carried by said brake head, means whereby said brake shoe has a sliding engagement with said brake head to thereby permit said brake shoe to adjust itself concentrically with the wheel, and a sliding key for holding said shoe and head together.

12. The combination of a brake head and a brake shoe, of means for slidably and tiltably securing the shoe to the head.

13. The combination with a brake head of a brake shoe and means for connecting said head and shoe to permit a combined swinging movement of said shoe relative to said head about an axis coincident with that of the wearing face of said shoe and an axis perpendicular with said first-mentioned axis and between said wearing face and head.

14. A brake shoe having a body and a reinforcing back bent to form the outer part of a key lug, there being a rounded projection on the body within the bent part of the back to form a bearing for the fastening key.

15. The combination with a brake head having oppositely disposed arms, and a brake shoe shiftably mounted on the head and having guide lugs arranged to engage the inner surface of said arms.

16. The combination with a brake head having oppositely disposed arms, and a brake shoe shiftably mounted on the head and having end lugs, a centrally disposed key lug, and guide lugs located between the end and key lugs to engage the inner surface of said arms.

17. The combination of a brake head having oppositely disposed arms, a brake shoe having seats at the back thereof and adjacent its ends to receive the ends of the brake head arms, said seats permitting a limited shifting movement of the brake shoe relative to the head, and means for securing the shoe on the head.

18. The combination of a brake head having oppositely disposed arms, a brake shoe having seats at the back thereof and adjacent its ends to receive the ends of the brake head arms, said seats permitting a limited shifting movement of the brake shoe relative to the head, guide lugs at the back of the shoe to engage the inner surface of the brake head arms, and means for securing the shoe on the head.

19. The combination of a brake head having oppositely disposed arms, a brake shoe having seats at its back to receive the ends of said arms, said seats being constructed to permit limited movement of the shoe relative to the head, guides on the shoe to engage with said arms and cause the shoe to tilt when it is moved relatively to the head, and means for securing the shoe on the head.

In witness whereof, I hereunto subscribe my name this 16th day of February, A. D. 1916.

CHARLES W. ARMBRUST.

Witnesses:
HAZEL A. JONES,
MAX W. ZABEL.